United States Patent [19]
Nasu

[11] Patent Number: 4,993,296
[45] Date of Patent: Feb. 19, 1991

[54] APPARATUS FOR CUTTING LAMINATED SHEET MATERIAL

[75] Inventor: Nobuo Nasu, Fukuyama, Japan

[73] Assignee: Kabushiki Kaisha Kawakami Seisakusho, Hiroshima, Japan

[21] Appl. No.: 502,997

[22] Filed: Mar. 29, 1990

[30] Foreign Application Priority Data

Apr. 14, 1989 [JP] Japan .................................. 1-94393

[51] Int. Cl.$^5$ ......................... D06H 7/00; B26D 1/00
[52] U.S. Cl. ...................................... 83/422; 83/424; 83/427; 83/938; 83/940
[58] Field of Search ............... 83/56, 76.6, 76.9, 76.1, 83/398, 427, 936–941, 422, 424, 428, 155

[56] References Cited

U.S. PATENT DOCUMENTS

| | | | |
|---|---|---|---|
| 3,495,492 | 2/1970 | Gerber et al. | 83/937 X |
| 3,511,124 | 5/1970 | Bruns | 83/427 X |
| 3,573,859 | 4/1971 | Sederberg | 83/433 X |
| 3,589,222 | 6/1971 | Sederberg | 83/938 X |
| 4,186,632 | 2/1980 | Leslie et al. | 83/13 |
| 4,790,224 | 12/1988 | Krutilla et al. | 83/155 X |
| 4,907,479 | 3/1990 | Nasu | 83/422 |
| 4,916,992 | 4/1990 | Nasu | 83/422 |

*Primary Examiner*—Hien H. Phan
*Assistant Examiner*—Eugenia A. Jones
*Attorney, Agent, or Firm*—Ladas & Parry

[57] ABSTRACT

An apparatus for cutting a laminated sheet material has a cutter receiving plate and a closure member connected to both ends of the receiving plate, and these are accommodated in a guide groove extending transversely across a supporting surface of a pedestal. A belt is supported on the supporting surface on front and back sides of the guide groove, and belt moving members are disposed on both sides of the belt longitudinally thereof for reciprocating the belt longitudinally. The laminated sheet material is supported on the belt and the belt moving members are moved to transport the belt and the laminated sheet material together in the longitudinal direction, with the stacked sheets and the already cut portions thereof moving along with the belt while carried thereon.

7 Claims, 6 Drawing Sheets

APPARATUS FOR CUTTING LAMINATED SHEET MATERIAL

BACKGROUND OF THE INVENTION

This invention relates to an apparatus for cutting a sheet material such as a fabric in the form of a laminate consisting of a number of sheets.

An example of a conventional cutting apparatus of this type has been proposed by the inventor in Japanese Patent Application Laid Open (KOKAI) No. 63-267190. This conventional apparatus includes a pedestal having a supporting surface provided with a transversely extending guide groove, a cutting receiving plate having a cutting receiving sleeve, and closure plates connected to both ends of the receiving plate, with the cutter receiving plate and closure plates being fitted into the guide groove. The upper surfaces of the cutter receiving plate, closure plates and supporting surface are disposed so as to be flush or substantially flush. Suction pipes for withdrawing air from both side surfaces of the laminate supported on the supporting surface are disposed on the supporting surface, a cutter head is supported above the cutter receiving plate so as to oppose the same, and a cutter inserted into the cutter receiving sleeve is mounted on the cutter head so as to be capable of moving up and down.

With this cutting apparatus, the laminate is supported on the supporting surface. The laminate consists of multiple plies of a sheet material such as fabric, and the major portion of the outer peripheral surface, inclusive of the top and bottom sides of the laminate, is covered with an air-impermeable sheet. Owing to the sucking action from the suction pipes, both side faces of the laminate are fixedly attracted to the suction pipes, in which state the laminate is supported on the supporting surface. The cutter is lowered so that its lower end is fitted into the cutter receiving sleeve, the suction pipes are reciprocated in the longitudinal (X) direction along with the laminate by a longitudinal drive mechanism, the cutter head and the cutter receiving plate are reciprocated synchronously in the transverse (Y) direction by a transverse driving mechanism, and the cutter head and cutter receiving sleeve are turned synchronously about their axes, whereby the laminate is cut into a desired shape.

A problem encountered in the conventional cutting apparatus described above is that as cutting proceeds, the fixed relationship among the stacked sheets diminishes at portions where cutting has ended, and therefore the sheets become positionally displaced relative to one another owing to friction at the immobile supporting surface. The result is that cutting cannot be performed accurately.

SUMMARY OF THE INVENTION

An object of the present invention is to provide a laminated sheet material cutting apparatus capable of performing cutting accurately through a comparatively simple structure.

According to the present invention, the foregoing object is attained by providing an apparatus for cutting a laminated sheet material, comprising: a pedestal having a supporting surface provided with a guide groove extending transversely of the supporting surface; a cutting receiving plate having a cutting receiving sleeve and accommodated in the guide groove; a closure member connected to both ends of the receiving plate and accommodated in the guide groove; a belt for supporting the laminated sheet material, the belt being supported on the supporting surface on front and back sides of the guide groove; upper surfaces of the cutter receiving plate, closure member and supporting surface being disposed so as to be level or substantially level with the same horizontal plane; belt moving members disposed on both sides of the belt longitudinally thereof for reciprocating the belt longitudinally; a cutter head supported above the cutter receiving plate and opposing the same; a cutter vertically movably mounted on the cutter head and having a lower end inserted into the cutter receiving sleeve; a transverse drive mechanism connected to the cutter head and the cutter receiving plate for synchronously reciprocating the same transversely; a turning mechanism connected to the cutter and the cutter receiving cylinder for synchronously turning the same about a vertical axis, and a longitudinal drive mechanism to which the belt moving member is connected for longitudinally reciprocating, in unison, the belt moving member, the belt and the laminated sheet material supported on the belt.

In the operation of the laminated sheet cutting apparatus according to the present invention, the laminated sheet material is supported on the belt, which is supported on the supporting surface of the pedestal. The belt moving member, the belt and the laminated sheet material are reciprocated longitudinally in unison by the longitudinal drive mechanism. As a result, even if the fixed relationship among the stacked sheets diminishes as cutting proceeds, the stacked sheets and the already cut portions thereof move along with the belt, which is not cut, while carried thereon. Consequently, accurate cutting free of positional displacement can be carried out, and since this can be accomplished merely by adding the belt to the conventional cutting apparatus, the apparatus of the present invention does not become overly complicated in structure.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

An embodiment of the present invention will now be described in detail with reference to the accompanying drawings.

Figure 1:
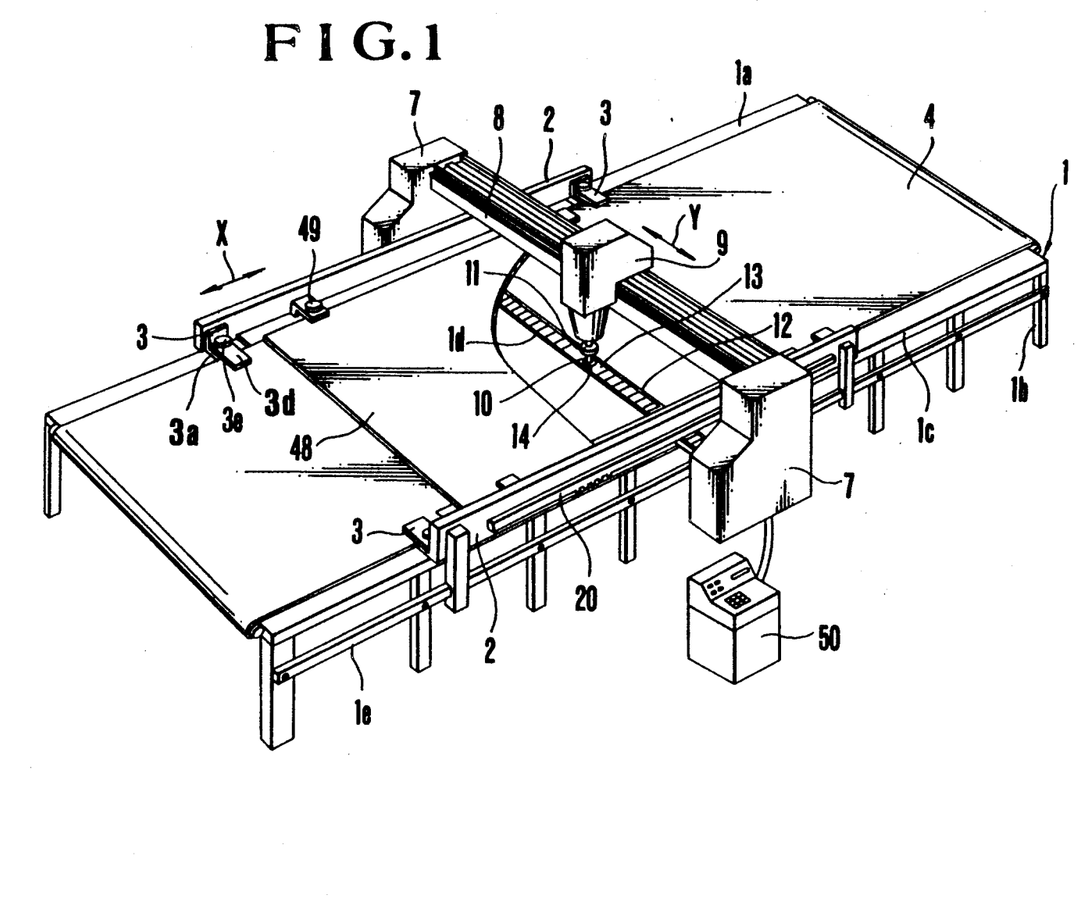
FIG. 1 is a perspective view illustrating an embodiment of a laminated sheet cutting apparatus according to the present invention.
Figure 3:
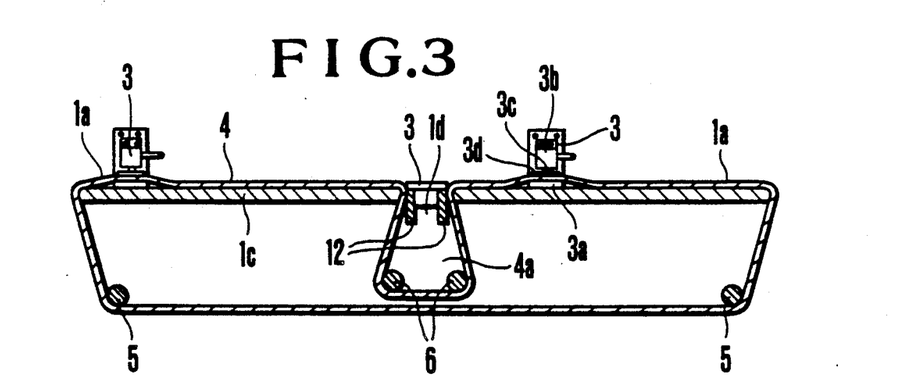
FIG. 3 is a longitudinal sectional side view showing a belt portion included in the apparatus.
Figure 4:
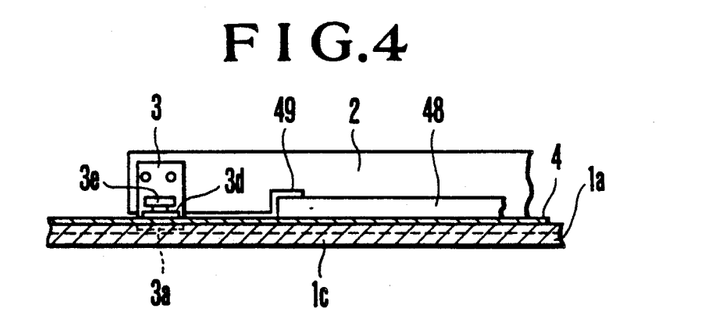
FIG. 4 is a partial longitudinal sectional side view showing the relationship between the belt and a belt moving member.

With reference to FIG. 1, a cutting apparatus in accordance with the present invention includes a pedestal 1 fixed to a floor by legs 1b to which a plate 1c having a rectangular supporting surface 1a is secured. A belt moving member 2 is provided on both longitudinal side portions of the supporting surface 1a. The belt moving member 2 is slidably engaged with and supported by a guide rail 1e extending longitudinally of the pedestal 1, and is so adapted as to perform translational motion in the longitudinal (X) direction of the supporting surface 1a. Belt fixtures 3 are provided on the front and rear ends of the belt moving member 2 and serve to detachably secure a belt 4 supported on the supporting surface 1a. As shown in FIGS. 1 and 3, a guide groove 1d is formed in the plate 1c of pedestal 1 and extends transversely across the plate at the central portion thereof in the longitudinal direction. The belt 4, which in this embodiment is an endless belt divided into front and rear sections relative to the guide groove 1d, is supported on the supporting plate 1a of the plate 1c, curves downwardly from the front and rear ends of the supporting surface 1a to be supported by front and rear rollers 5, and curves downwardly from front and rear sides of the guide groove 1d to be supported by intermediate rollers 6. Thus, the belt 4 is arranged to have a recess 4a at the portion thereof opposing the guide groove 1d. As shown in FIG. 3, each belt fixture 3 includes a rest plate 3a and an air cylinder 3b secured to the inner side face of the belt moving member 2, which has the shape of an elongated rectangular rod, a piston 3c provided in the air cylinder 3b, and a pressure plate 3d affixed to the piston 3c. The pressure plate 3d is lowered along with the piston 3c to clamp the longitudinal side edge of the belt 4 between the rest plate 3a and the pressure plate 3d. Alternatively, as illustrated in FIGS. 1 and 4, the fixture 3 used may be one in which the longitudinal side edge of the belt is clamped between a clamping plate 3d and the rest plate 3a by employing screws 3e.

Figure 5:
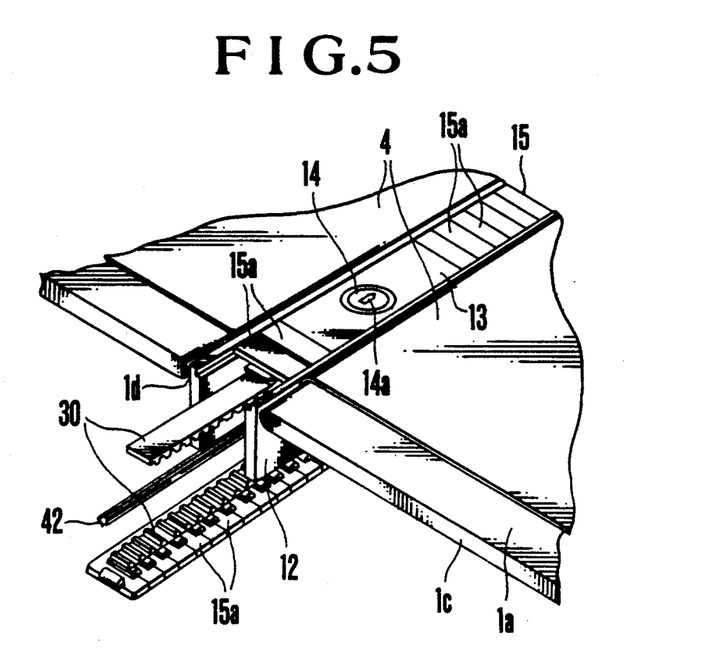
FIG. 5 is a partial perspective view showing a cutter receiving plate and a closure member included in the apparatus.

As depicted in FIG. 1, two frames 7 are erected opposite the ends of the guide groove 1d, and a beam member 8 is provided to span the upper ends of the frames 7. The beam member 8 has an upper surface on which a cutter head 9 supported in engaged fashion so as to be reciprocatable in the longitudinal (Y) direction. A knifelike cutter 10 and a cutter guide 11 are mounted on the cutter head 9 in a manner described later, and the cutter 10 is supported on the cutter head 9 so as to be turnable about a vertical axis. As shown also in FIG. 5, guide rails 12 are disposed on both sides of the guide groove 1d and fixedly secured to the frames 7. A cutter receiving plate 13, which is situated directly below the cutter head 9, and a closure member 15 are engaged with and supported by the guide rails 12 so as to be reciprocatable transversely within the guide groove 1d. The cutter receiving sleeve 14 situated directly below the cutter 10 is held on the cutter receiving plate 13 so as to be turnable about a vertical axis. The closure member 15 comprises a number of closure plates 15a linked so as to be free to flex. These closure plates 15a construct an endless belt together with the cutter receiving plate 13 whose opposite edges are connected to the closure plates 15a on both its sides. Portions of the closure member 15 which are folded back and project from both sides of the guide groove 1d are supported on guide wheels (not shown). The upper surface of the cutter receiving plate 13 inclusive of the cutter receiving sleeve 14, the upper surface of the closure member 15 and the upper surface of that portion of belt 4 situated on the supporting surface 1a are disposed to be level or substantially level with the same horizontal plane.

Figure 2:
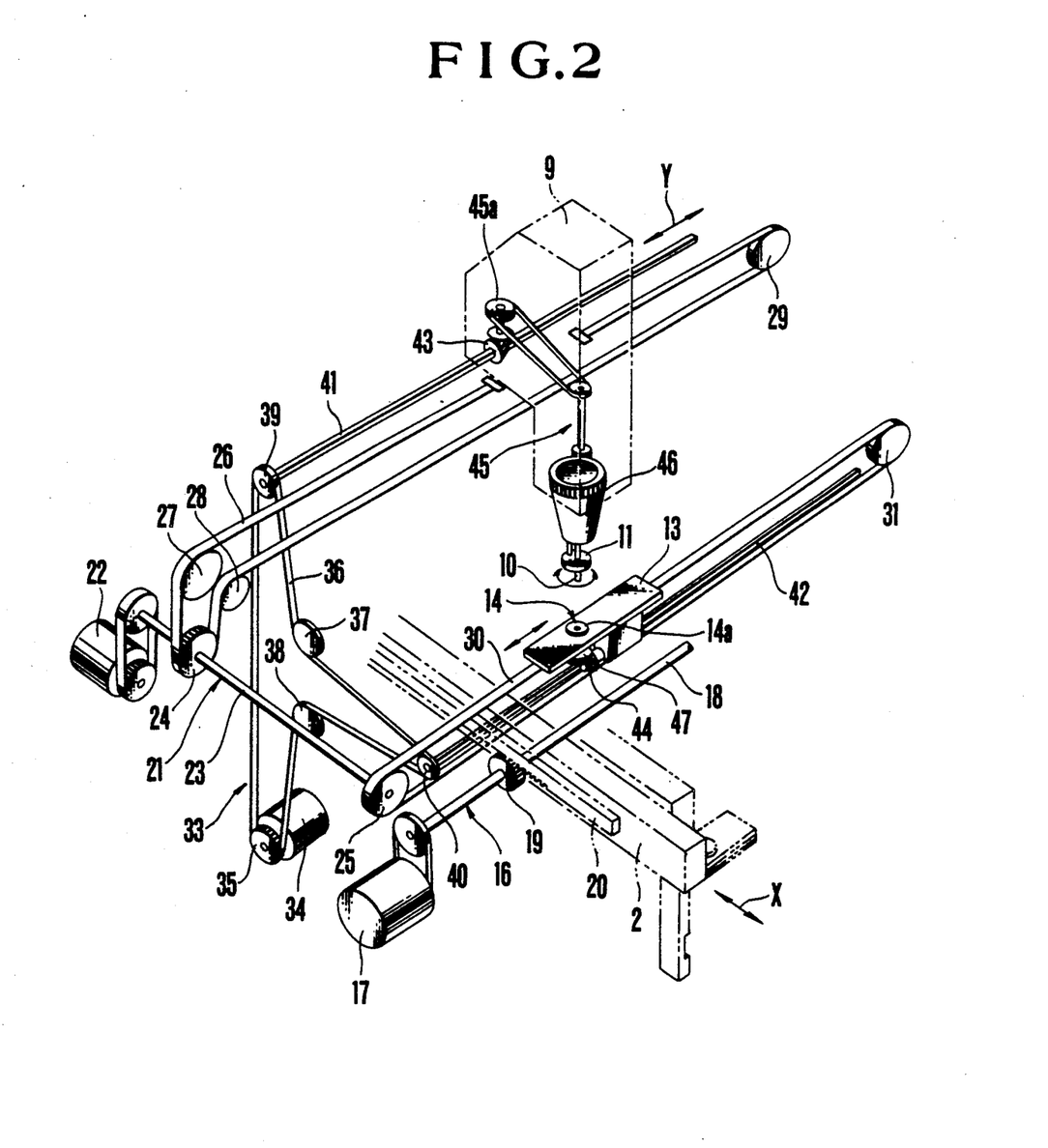
FIG. 2 is a perspective view showing a drive mechanism included in the apparatus.

As depicted in FIGS. 1 and 2, there is provided a longitudinal drive mechanism 16 for reciprocating the belt moving member 2 in the longitudinal (X) direction in unison with the belt 4. The longitudinal drive mechanism 16 includes a reversible drive motor 17, a connecting shaft reversibly rotated by the motor 17 and axially supported so as to extend transversely across the plate of the pedestal 1, and a pinion 19 fixedly fitted on the connecting shaft 18 and meshed with a rack bar fixed to the side face of each belt moving member and extending in the longitudinal direction.

Also provided is a transverse drive mechanism 21 for synchronously reciprocating the cutter head 9 and the cutter receiving plate 13 in the transverse (Y) direction. The transverse drive mechanism 21 includes a reversible transverse drive motor 22, and a synchronous shaft 23, extending horizontally in the longitudinal direction, to which the rotating drive of the motor 22 is transmitted. Fixedly fitted on the shaft 23 are first and second drive gears 24, 25. Also included is a first drive belt 26 whose opposite ends are secured to both sides of the cutter head 9. Starting from one side of the cutter head 9, the first drive belt 26 extends horizontally in the transverse direction, is supported by guide wheels 27, 28 between which the belt is meshed with the first drive gear 24, then extends in the opposite direction and is supported by a driven wheel 29 before looping back to be connected to the other side of the cutter head 9. The mechanism includes also a second drive belt 30 whose opposite ends are secured to both ends of the cutter receiving plate 13. Starting from one end of the receiving plate 13, the second drive belt 30 extends horizontally in the transverse direction to mesh with the second drive gear 25, then extends back in the opposite direction to be supported by a driven wheel 31 before looping back to be connected to the other end of the cutter receiving plate 13.

A turning mechanism 33 is provided for turning the cutter 10 and the cutter receiving sleeve 14 synchronously about a vertical axis. The turning mechanism 33 includes a reversible cutter drive motor 34, a drive gear 35 to which the rotating drive of the motor 34 is transmitted, and an endless belt 36. The latter is meshed with the drive gear 35, supported by guide wheels 37, 38 and meshed with upper and lower driven wheels 39, 40. The upper and lower driven wheels 39, 40 are fixedly fitted on one ends of respective upper and lower spline shafts 41, 42 extending horizontally in the transverse direction across the plate 1c. Upper and lower bevel gears 43, 44 are engaged with the upper and lower spline shafts 41, 42, so as to be capable of sliding axially of the shafts. The arrangement is such that the upper bevel gear 43 transmits a turning force to a vertical directing cylinder 46 via a turning force transmitting mechanism 45 comprising a vertical bevel gear 45a meshing with the upper bevel gear 43. The vertically movable cutter 10 and the cutter guide 11 are supported on the directing cylinder 46 so as to turn together therewith. The upper bevel gear 43, turning force transmitting mechanism 45 and directing cylinder 46 are supported on the cutter head 9 and the major thereof is accommodated within the cutter head 9. Though not shown, an elevating mechanism for raising and lowering the cutter 10 is provided inside the cutter head 9. The cutter guide 11 is adapted to be stopped at any desired upper and lower positions by suitable means, and the cutter 10 is fitted into and supported by the cutter guide so as to be capable of moving up and down relative thereto. The lower bevel gear 44 is turnably engaged with and supported by the cutter receiving plate 13, a columnar lower bevel gear 47 which meshes with the lower bevel gear 44 is fixed to the cutter receiving sleeve 14, and the latter is formed to have a cutter insertion hole 14a. The cutter receiving sleeve 14 is supported on the cutter receiving plate 13 via a bearing, not shown. The longitudinal drive motor 17, transverse drive motor 22, synchronous shaft 23, first and second drive gears 24, 25, guide wheels 27, 28, cutter drive motor 34, drive gear 35, endless belt 36 and guide wheels 37, 38 are provided inside one of the frames 7, and the driven wheels 29, 31 are provided inside the other frame 7. Furthermore, the first drive belt 26 and upper spline shaft 41 are disposed on the beam member 8. The above-described longitudinal drive mechanism 16, transverse drive mechanism 21, turning mechanism 33 and cutter elevating mechanism have substantially the same construction as those disclosed in Japanese Patent Application Laid-Open No. 63-267190.

Figure 6:
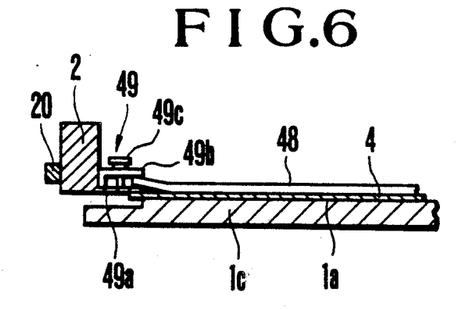
FIG. 6 is a partial transverse sectional front view showing a laminated sheet retaining portion included in the apparatus.

In FIG. 1, numeral 48 denotes a laminated sheet material placed on the belt 4. As shown in FIG. 6, the laminated sheet material 48 has both its side edges supported on a support plate 49a of a laminate retainer 49 fixed longitudinally of the belt moving member 2. A generally L-shaped tightening body 49b is tightened on the support plate 49a by a bolt 49c, whereby both side edges of the laminate 48 are detachably fixed by the support plate 49a and tightening body 49b. Numeral 50 denotes a control unit for controlling the longitudinal drive mechanism 16, transverse drive mechanism 21, turning mechanism 33, cutter elevating mechanism, etc.

The operation of this embodiment of the cutting apparatus constructed as set forth above will now be described.

First, as shown in FIG. 1, the laminate 48 consisting of a number of sheets of fabric or the like is supported on the belt 4, both side edges of the laminate 48 are placed on the support plates 49a of the retainers 49 depicted in FIG. 6, and the tightening bodies 49b are tightened by the bolts 49c at a plurality of locations in the longitudinal direction, thereby securing the laminate to the belt moving members 2 so as to span the cutter receiving plate 13 and closure member 15. The cutter guide 11 and cutter 10 are elevated before placing the laminate 48 on the belt 4. Next, in response to a command from the control apparatus 50, the motor 17 of the longitudinal drive mechanism 16 is driven into operation to turn the pinion 19 via the connecting shaft 18, and the belt moving member 2 is moved owing to the meshing engagement between the pinion 19 and rack bar 20. As a result, the belt 4 and laminate 48 are transported horizontally in the longitudinal direction in unison with the belt moving member, and the leading edge of the laminate 48 is brought into position directly below the cutter 10. Concurrently, the motor 22 of the transverse drive mechanism is driven into operation to revolve the first and second drive belts 26, 30 via the synchronous shaft 23 and first and second drive gears 24, 25, thereby translating the cutter head 9 and cutter receiving plate 13 while synchronizing their movement. In this case, the cutter head 9 is transported along the beam member 8 and the cutter receiving plate 13 is moved together with the closure plates 15a along the guide rails 12 within the guide groove 1d extending across the plate 1c. By virtue of the longitudinal and transverse movement described above, the cutter 10 is brought above the cutting starting position, after which movement is halted. In this state the cutter 10 is lowered by the cutter elevating mechanism, not shown, whereby the cutter 10 is inserted into the directing cylinder 46 and a directing hole, not shown, provided in the cutter guide 11. The distal end of the cutter 10 in this state is fitted into and supported by the cutter insertion hole 14a of the cutter receiving sleeve 14 attached to the cutter receiving plate 13. Furthermore, the cutter guide 11 is also lowered by suitable means to lightly press the upper surface of the laminate 48.

Next, in response to a command from the control unit 50, the motors 17, 22 of the longitudinal and transverse drive mechanisms 16, 21 are driven in forward and reverse in suitable fashion to move the belt moving members 2, belt 4 and laminate 48 longitudinally in unison, move the cutter head 9 transversely in unison with the cutter 10, and move the cutter receiving plate 13 transversely in unison with the cutter receiving sleeve 14, as described above. Further, the motor 34 of the turning mechanism 33 is driven in forward and reverse to turn the upper and lower driven wheels 39, 40 via the drive gear 35 and endless belt 36 and turn the upper and lower bevel gears 43, 44 via the upper and lower spline shafts 41, 42. Owing to rotation of the upper bevel gear 43, the directing cylinder 46 and the cutter head 11 are turned in unison via the upper vertical bevel gear 45a and turning force transmitting mechanism 45, and owing to the rotation of the lower bevel gear 44, the cutter receiving sleeve 14 is turned in synchronization with the directing cylinder 46 and cutter guide 11 via the lower vertical bevel gear 47, as a result of which the knife-like cutter 10 is supported at a plurality of vertical locations and its cutting edge oriented in the cutting direction to cut the laminate 48 into the desired shape. In this case, it is preferred that the shape to be cut be stored in the control unit 50 and the operation of the longitudinal and transverse drive mechanisms 16, 21 and turning mechanism be controlled in conformity with the stored shape. At the completion of cutting, the motors 17, 22, 34 are stopped and the cutter 10 and the cutter guide 11 are elevated. As a result of these operations, the cutter 10 is brought above the next cutting starting position and cutting is performed in the same manner as described above. It does not matter whether the cutting operation of each cycle cuts the laminate 48 into a different shape or the same shape. At the end of cutting over the entire surface of the laminated sheet 48, the remaining portion of the laminate 48 is detached by loosening the bolt 49c of the retainer 49.

The cutting apparatus of the illustrated embodiment is such that the laminate 48 of sheet material is placed on the belt 4 and moved in the longitudinal and transverse directions. As a result, even if the fixed relationship among the stacked sheets diminishes, the laminate 48 can be cut accurately without positional displacement.

Since both longitudinal side edges of the belt 4 are secured on the supporting surface 1a of the pedestal 1 by the fixtures 3, the stacked sheets 48 placed on the belt 4 can be moved accurately even though the apparatus is simple in structure.

Figure 7:
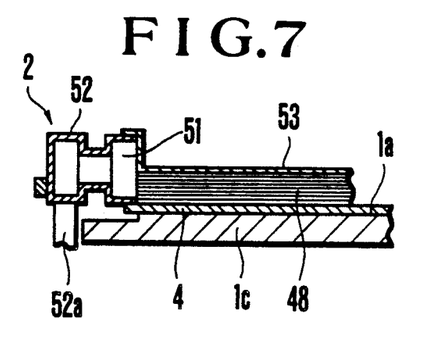
FIG. 7 is a partial transverse sectional front view showing a modification of the laminated sheet retaining portion.

In the present invention, the opposing side faces of the belt moving members 2 are each provided with a suction port 51, as shown in FIG. 7, and a suction pipe 52 communicating with the suction port 51 is communicated with a suction source, not shown, via a flexible suction duct 52a, just as described in Japanese Patent Application Laid-Open No. 63-267190. In a case where the laminate 48 possesses air permeability, as when it consists of a fabric or the like, the major part of its upper surface and outer peripheral surface is covered with an air impermeable sheet 53. By driving the suction source and withdrawing air from the suction port 51 via the suction pipe 52, the laminate 48 is fixedly attracted to the belt moving member 2 and is cut by being moved together with the air-impermeable sheet 53. This is also possible if the belt 4 is impermeable to air. In a case where the belt 4 is air permeable, it will suffice to cover the bottom side of the laminate 48 with an air-impermeable sheet.

Figure 8:
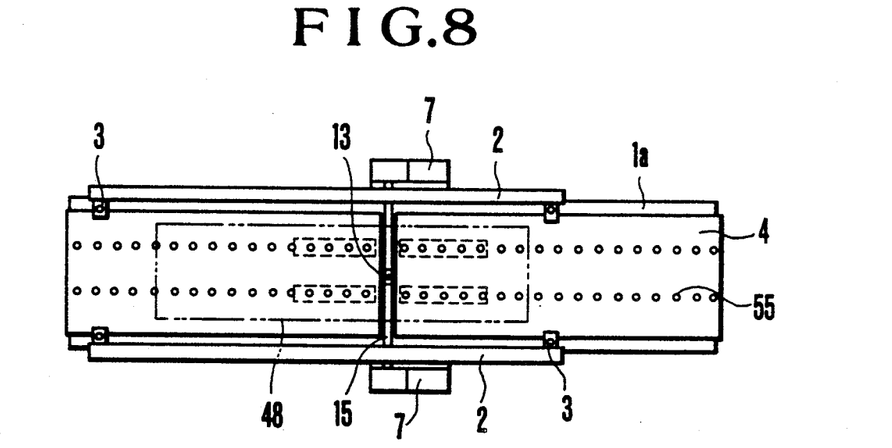
FIGS. 8 and 9 are a plan view and enlarged transverse sectional front view, respectively, showing a modification of the belt and a plate of the pedestal.
Figure 9:
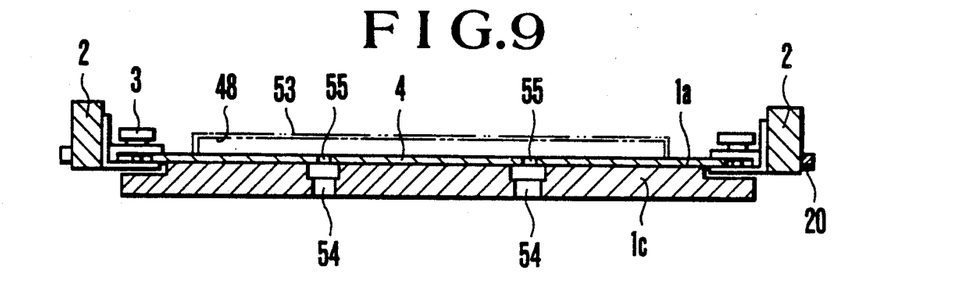

As shown in FIGS. 8 and 9, a modification of the invention is possible in which the plate 1c of the pedestal and an air-impermeable belt 4 supported on the supporting surface 1a of the plate are respectively provided with a number of large and small vent holes 54, 55 spaced apart at a predetermined pitch in the longitudinal direction, plural rows of these large and small vent holes 54, 55 are provided in parallel in the transverse direction, and the vent holes 54 in the plate 1c and the vent holes 55 in the belt 4 are made to coincide. The air-permeable laminate 48 is placed on the belt 4, the major part of its upper surface and outer peripheral surface is covered with the air-impermeable sheet 53, the vent holes 54 provided in the plate 1c are communicated with the suction source, not shown, and the latter is driven into operation. As a result, air is withdrawn via the vent holes 54, 55 and the laminate 48 is attracted to the belt 4. The laminate 48 may then be reciprocated longitudinally together with the belt moving member 2.

Accordingly, in the arrangement of FIG. 7 and in the arrangement shown in FIGS. 8 and 9, it is unnecessary for the belt moving member 2 to be provided with the retainer 49 shown in FIG. 6. In the arrangement of FIGS. 8 and 9, the vent holes 54 in the plate 1c can be communicated from the suction source to a compressor or blower by changing over an electromagnetic valve, and air can be blown toward the belt 4 via the vent holes 54, 55 after the laminate 48 is cut, thereby making it possible to readily move the laminate 48 longitudinally on the belt 4.

Figure 10:
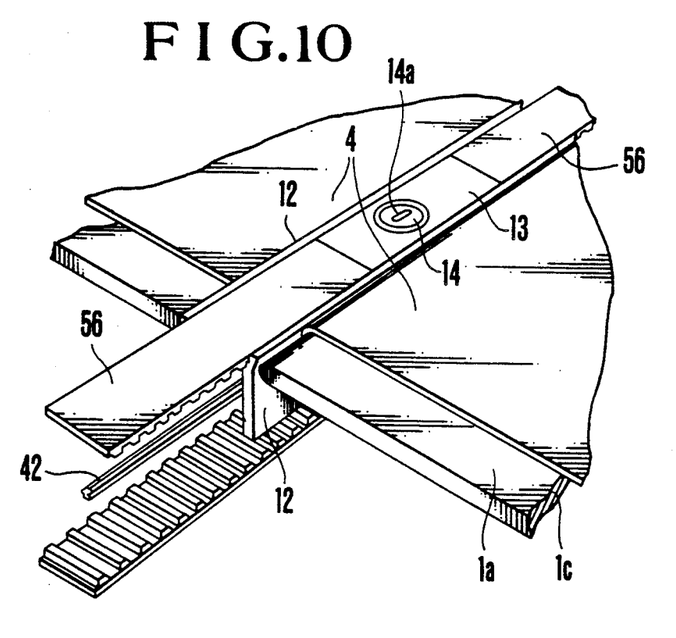
FIG. 10 is a partial perspective view, corresponding to FIG. 5, showing a modification of the closure member.

In a modification shown in FIG. 10, closure plates 56 connected to both ends of the cutter receiving plate 13 serve also as the second drive belt for moving the receiving plate 13 in the transverse direction. This makes it possible to reduce the number of component parts and simplify the structure in comparison with the arrangement of FIG. 4.

Figure 11:
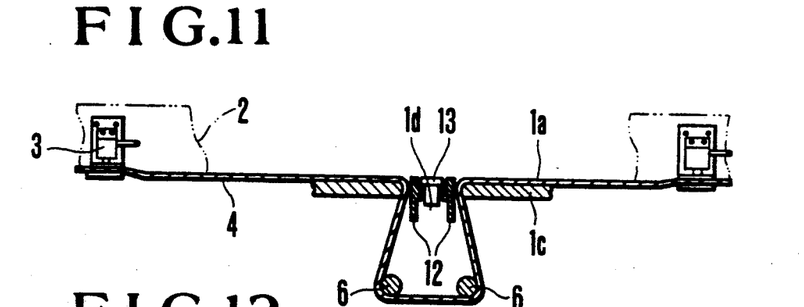
FIGS. 11, 12 and 13 are longitudinal sectional side views showing different modifications of the belt.
Figure 12:
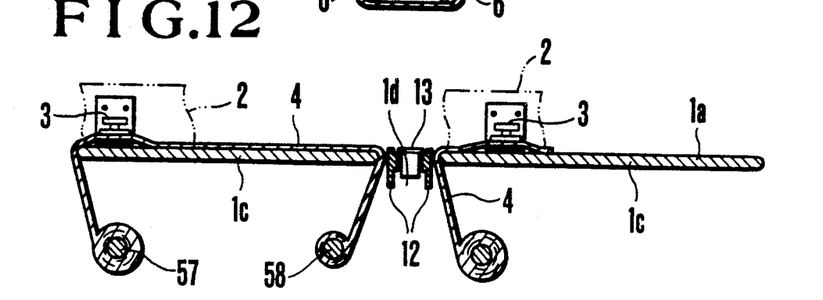
Figure 13:
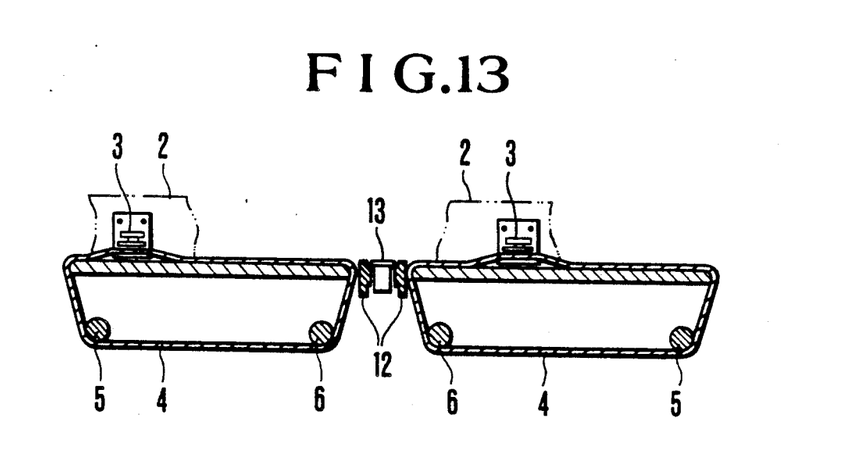
Figure 14:
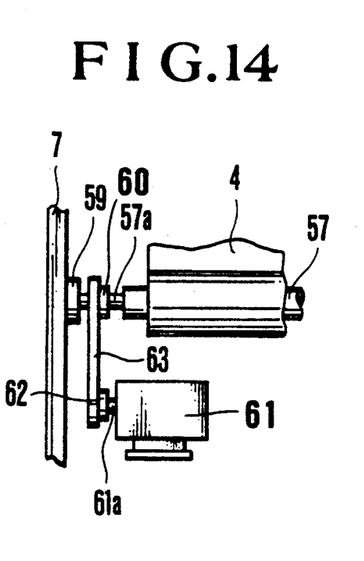
FIGS. 14 and 15 are front views showing different take-up mechanisms for taking up the belt shown in FIG. 12.
Figure 15:
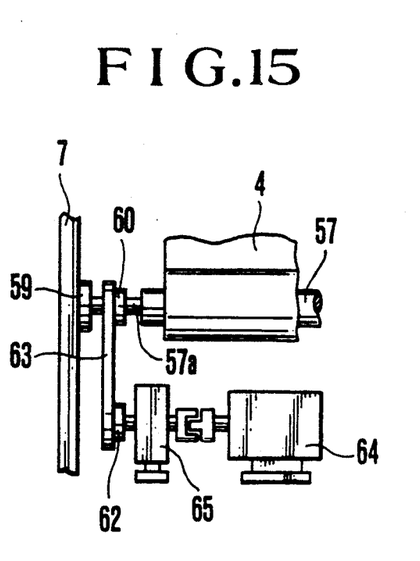

FIGS. 11, 12 and 13 illustrate different modifications of the belt. The belt 4 shown in FIG. 11 is not an endless belt. Instead, both ends of the belt are fixed to the belt moving members 2 by the belt fixtures 3, and the belt at front and rear sides of the recess 4a at the lower portion is supported by intermediate rollers 6. The result is a more simplified structure. The belt shown in FIG. 12 also is not an endless belt. Here the belt is divided into front and rear belts. The rear belt 4 has one end connected to an underlying drive roller 57 and its other end connected to an underlying support roller 58. As shown in FIG. 14, the rollers 57, 58 are axially supported on the frame 7 via a bearing 59, a pulley 60 is fixedly fitted on the a shaft 57a secured to the drive roller 57, a pulley 62 is fixedly fitted onto a shaft 61a of a torque motor 61 installed below the drive roller 57, and an endless belt 63 is engaged with the pulleys 60, 62. The belt 4 revolves in the reverse direction when it is paid out from the drive roller 57 and revolves in the forward direction when it is taken up, and the belt 4 is transported along with the belt moving member 2 while maintained at a proper, fixed tension at all times. The front belt 4 has one end connected to a drive roller 57 and its other end connected to the belt moving member 2 by the belt fixture 3. Though the support roller is deleted, the front belt 4 performs almost the same function as the rear belt 4. The torque motor 61 is adapted to rotate faster than the speed at which the front and rear belts 4 move. As shown in FIG. 15, an arrangement in which a motor 64 that rotates solely in the take-up direction is connected to a power clutch 65 can be used instead of the torque motor of FIG. 14. In FIG. 15, the belt 4 experiences a large amount of slip when paid out from the drive roller 57 and a small amount of slip when taken up, and the belt is maintained at a constant tension while being moved together with the belt moving member. As shown in FIG. 13, two endless belts 4 can be provided as front and rear belts. Furthermore, an arrangement can be adopted in which one of the belts shown in FIG. 12 or 13 is provided on one side of the guide groove 1d of the pedestal and the other of the belts shown in FIG. 12 or 13 is provided on the other side of the guide groove 1d.

It should be noted that portions in FIGS. 7 through 15 corresponding to those in FIGS. 1 through 6 are designated by like reference characters.

In the present invention, if the laminate of sheet material is detachably secured to one or both of the belt and belt moving member, suitable fixing means such as adhesive tape can be used. In the above-described embodiment, the cutter guide can be moved up and down manually with respect to the directing cylinder, or the cutter guide can be moved up and down in operative association with the cutter. However, it is required that the cutter guide be movable up and down independently with respect to the cutter.

Thus, in accordance with the present invention as described hereinabove, there is provided an apparatus in which a cutter receiving plate and a closure member connected to both ends of the receiving plate are accommodated in a guide groove extending transversely across a supporting surface of a pedestal, a belt is supported on the supporting surface on front and back sides of the guide groove, and belt moving members are disposed on both sides of the belt longitudinally thereof for reciprocating the belt longitudinally. As a result, by supporting a laminated sheet material on the belt and moving the belt moving members, the belt and the laminated sheet material together in the longitudinal direction, the stacked sheets and the already cut portions thereof move along with the belt while carried thereon. Consequently, accurate cutting free of positional displacement can be carried out, and since this can be accomplished merely by adding the belt to the conventional cutting apparatus, the apparatus of the present invention does not become overly complicated in structure.

As many apparently widely different embodiments of the present invention can be made without departing from the spirit and scope thereof, it is to be understood that the invention is not limited to the specific embodiments thereof except as defined in the appended claims.

What is claimed is:

1. An apparatus for cutting a laminated sheet material, comprising:
    a pedestal having a supporting surface provided with a guide groove extending transversely of said supporting surface;
    a cutter receiving plate having a cutter receiving sleeve and accommodated in the guide groove;
    a closure member connected to both ends of said receiving plate and accommodated in the guide groove;
    a belt for supporting the laminated sheet material, said belt being supported on the supporting surface on front and back sides of the guide groove, upper surfaces of said cutter receiving plate, said closure member and said supporting surface being disposed so as to be or substantially with a horizontal plane;
    belt moving members disposed on both sides of said belt longitudinally thereof for reciprocating said belt longitudinally;
    a cutter head supported above and opposing said cutter receiving plate;
    a cutter vertically movably mounted on said cutter head and having a lower end inserted into said cutter receiving sleeve;
    a transverse drive mechanism connected to said cutter head and said cutter receiving plate for synchronously reciprocating the cutter head and the cutter receiving plate transversely;
    a turning mechanism connected to said cutter and said cutter receiving sleeve for synchronously turning the cutter and the cutter receiving sleeve about a vertical axis; and
    a longitudinal drive mechanism to which said belt moving members are connected for longitudinally reciprocating, in unison, said belt moving members, said belt and the laminated sheet material supported on said belt.

2. The apparatus according to claim 1, wherein each of said belt moving members has laminated sheet material retainers for detachably fixing both longitudinal side edges of the laminated sheet material in the longitudinal direction.

3. The apparatus according to claim 1, wherein said belt moving members have suction ports in opposing side faces thereof and are equipped with suction pipes communicated with the suction ports and secured to said belt, said suction pipes being communicated with a suction source via a flexible suction duct, wherein the laminated sheet material is capable of being reciprocated longitudinally while fixedly attracted to said suction pipes.

4. The apparatus according to claim 1, wherein said belt is impermeable to air, said supporting surface and said belt are formed to have a number of air vents that coincide with each other, the air vents are communicated with a suction source, and the laminated sheet material is capable of being reciprocated longitudinally while fixedly attracted to said belt.

5. The apparatus according to claim 1, wherein said belt is endlessly connected to said supporting surface on the front and back sides of the guide groove.

6. The apparatus according to claim 1, wherein said belt is separated into a segment on the front side and a segment on the back side of the guide groove, both of said segments being disposed on the supporting surface.

7. An apparatus for cutting a laminated sheet material, comprising:
    a pedestal having a supporting surface provided with a guide groove extending transversely of said supporting surface;
    a cutter receiving plate having a cutter receiving sleeve and accommodated in the guide groove;
    a closure member connected to both ends of said receiving plate and accommodated in the guide groove;
    a belt for supporting the laminated sheet material, said belt being supported on the supporting surface on front and back sides of the guide groove, upper surfaces of said cutter receiving plate, said closure member and said supporting surface being disposed so as to be or substantially with a horizontal plane;
    suction pipes disposed on both sides of said belt longitudinally thereof and connected to said belt for reciprocating said belt longitudinally, said suction pipes having suction ports arranged to oppose each other;
    said supporting surface and said belt being formed to have a number of air vents that coincide with each other, the air vents being communicated with a suction source and a blower;
    a cutter head supported above and opposing said cutter receiving plate;
    a cutter vertically movably mounted on said cutter head and having a lower end inserted into said cutter receiving sleeve;
    a transverse drive mechanism connected to said cutter head and said cutter receiving plate for synchronously reciprocating the cutter head and the cutter receiving sleeve transversely;
    a turning mechanism connected to said cutter and said cutter receiving sleeve for synchronously turning the cutter and the cutter receiving sleeve about a vertical axis; and
    a longitudinal drive mechanism to which said suction pipes are connected for longitudinally reciprocating, in unison, said suction pipes, said belt and the laminated sheet material supported on said belt.

* * * * *